United States Patent Office 3,331,751
Patented July 18, 1967

3,331,751
PROTEASE ELABORATED BY *STREPTOMYCES MODERATUS* SP. N
Fritz Reusser, Portage, Mich., assignor to The Upjohn Company, Kalamazoo, Mich., a corporation of Delaware
No Drawing. Filed Nov. 23, 1964, Ser. No. 413,285
4 Claims. (Cl. 195—62)

This invention relates to a proteolytic enzyme, more particularly a proteolytic enzyme obtainable from cells of a streptomycete, and a process for the production of said proteolytic enzyme.

Proteolytic enzymes, also known as proteases, act upon protein substrates to break down the protein to various substances referred to as proteoses, peptones, amino acids, and the like. A large number of such enzymes is known in the art and they are widely used. However, most of the proteases so far obtained are recovered from the medium in which the microorganism is grown and are therefore present extra cellularly. In the case of the instant proteolytic enzyme, recovery is obtainable from the cells themselves, indicating that the inventive enzyme is present intracellularly. As such the intracellular protease offers advantages in regard to processing in that the cells are recovered with relative ease as an inexpensive initial concentration step.

The source used herein for preparation of the novel composition of matter is the cells of *Streptomyces moderatus* Sp. N. A culture of the living organism can be obtained from the permanent collection of the Northern Utilization Research and Development Division, Agriculture Research Service, Peorio, Ill., U.S.A. Its accession number in this repository is NRRL No. 3150. Its appearance and microscopic characterizations, its utilization of carbon compounds in a synthetic medium, and its cultural and physiological characteristics are given in application No. 1944, Ser. No. 413,306, filed on even date herewith.

The novel protease is produced by the streptomycete during growth thereof in an aqueous nutrient medium under aerobic conditions. Aerobic conditions as used herein means submerged aerobic conditions, surface culture conditions and shake flask conditions. The *Streptomyces moderatus*, Sp. N. is grown in an aqueous nutrient medium containing a carbon source, for example, an assimilable carbohydrate, and a nitrogen source, for example, an assimilable nitrogen compound or a proteinaceous material. Preferred carbon sources include glycose, brown sugar, sucrose, glycerol, starch, corn starch, galactose, dextran, molasses, and the like. Preferred nitrogen sources include corn steep liquor, yeast, autolyzed brewers's yeast with milk solids, soybean meal, cottonseed meal, cornmeal, milk solids, pancreatic digest of casein, distillers' solubles, animal pentone liquors, meat and bone scraps, and the like. A combination of these carbon and nitrogen source materials can be used advantageously. Supplemental salts and trace elements, for example phosphates, sulfates, potassium, sodium, copper, zinc and iron, and the like, are not separately added to the medium for they are provided by the tap water and the above-mentioned sources of carbon and nitrogen.

The optimum pH range for growth of the streptomycete ranges from about 6 to about 8 with from about 7.0 to about 7.2 preferred. The temperature of the nutrient medium is maintained between about 15 and about 32° C. with a temperature of from about 28 to about 30° C. preferred. The time required for the streptomycete to grow to the extent necessary for good yields of the proteolytic enzyme varies considerably, depending upon the nature of the particular ingredients used in the nutrient medium. Nevertheless, a time period of from about 48 to about 120 hours is adequate for the production of substantial content of the enzyme by the streptomycete.

The new enzyme is a proteinaceous material of as yet unknown chemical structure. It has been purified to the point of substantial homogeneity in different starch-gel electrophoresis systems. The novel enzyme is a basic protein with an isoelectric point slightly above pH 8.6 by zone electrophoresis. Its enzymatic activity is inhibited by diisopropyl fluorophosphate, zinc, copper and cobalt ions, whereas reagents interfering with sulfhydryl groups do not cause inhibition. Minimal molecular weight has been found to be approximately 15,000 and amino acid analysis shows a high content of glycine, aspartic acid and alanine. Based on the minimal molecular weight of about 15,000, only one residue each of methionine and cysteine is present per molecule.

Proteolytic activity is determined with ether denatured hemoglobin or congocoll as substrates. In the case of hemoglobin, the proteolysis is stopped as desired by the addition of an equal volume of 10% cold trichloroacetic acid, and the supernatant is separated by filtration or centrifugation. In this supernatant, the increase of ninhydrin positive material, expressed in leucine equivalents, is used as a measure of proteolysis. The ninhydrin reagent is prepared as described by Moore and Stein, J. Biol. Chem. 211, 907 (1954). In the case of the congocoll reaction, aliquots of the enzyme solution are placed into test tubes containing 50 mg. congocoll. The proteolysis is stopped at appropriate time intervals by removing the unreacted solids by filtration according to the technique of Nelson et al., Anal. Biochem. 2, 39 (1961). The optical density of the solubilized red color in the filtrates is read at 495 m$\mu$ to show the extent of proteolysis, this method being particularly useful since the reaction takes place relatively quickly and can be followed visually.

The novel protease is easily soluble in water and non-dialyzable in cellophane. Its proteolytic activity is inhibited by zinc, copper and cobalt but is not metal ion dependent. During a 24-hour storage period at room temperature, the proteolytic activity measured by the above-stated congocoll reaction is quantitatively and irreversibly abolished in buffer solutions below pH about 5 and above pH about 10. Under the same conditions, but with a pH range of from about 5 to 9, partial activity is retained by the protease with the optimal pH for stability being about pH 7. Results show that the novel protease is rather labile in aqueous solutions but maintains full activity when preserved as a dry powder in the dehydrated state. The proteolytic activity of the novel composition of matter obtains at from pH about 4 to about 11, with a rather clear optimum at pH about 8. Using hemoglobin as a substrate, iron, calcium, magnesium, and manganese ions do not interfere with proteolytic activity. Zinc, copper and cobalt ions cause inhibition to the extent of 88%, 60% and 38%, respectively. The chelating agents ethylenediaminetetraacetic acid and potassium cyanide both cause some inhibition. Iodine, diiodosobenzoic acid, iodoacetic acid, L-cysteine and 5,5'-dithiobis-(2-nitrobenzoic acid) are without effect. Diisopropyl fluorophosphate is strongly inhibitory. The novel protease is useful in selective degradation and component studies of proteinaceous hormones, e.g., bovine growth hormone; in preparing hides for tanning and in fruit juice clarification.

In a preferred procedure for the propagation of the streptomycete and production of the novel protease, *Streptomyces moderatus* Sp. N. was grown in shake flasks in a pH 7.2 medium containing per liter of tap water 25 gm. of cerelose and 25 gm. of industrial grade of cottonseed flour (Pharmamedia, Traders Oil Mill Company, Fort Worth, Tex.). The incubation period was five days at 28° C. The mycelium was recovered as a cake by filtration and the cake was washed thoroughly with purified water U.S.P. The washed cake was then frozen at −20° C. and rethawed to bring about breakage of the cells. A 300 gm. portion of wet re-thawed cake was suspended in purified water U.S.P. with 600 ml. of glass beads and the total volume of the suspension was made up to 1200 ml. with more water. The whole was homogenized for 30 minutes in a colloid mill (Eppenbach, Gifford-Wood Company, LaGrange, Ill.) at full speed and a temperature of about 15° C. The whole was centrifuged at 5000 r.p.m. in a refrigerated centrifuge to separate the proteolytically active supernatant and the residue. The supernatant was recovered and dried to a powder by lyophilization. This powder retained full enzymatic activity for a period of two years' storage at a temperature of 2° C.

Further purification of the protease was carried out by dissolving 3 gm. of the above dry powder in 150 ml. 0.1 M tris(hydroxy methyl) aminomethane-hydrochloric acid buffer of pH 8 at a temperature of 0° C. (ice bath). To this solution 0.15 ml. of 1 M solution of manganese chloride was added with stirring and the resultant solution was clarified by centrifugation at 10,000 r.p.m. for 20 minutes at 2° C. The supernatant was recovered and readjusted to 150 ml. with the same buffer. To this solution a sufficient quantity of solid ammonium sulfate to 80% saturation was added. The resulting precipitate was allowed to settle at 2° C. for four hours. The whole was then centrifuged at 10,000 r.p.m. at −10° C. for 20 minutes. The supernatant was discarded and the precipitate was redissolved in 150 ml. of the same buffer. Addition of solid ammonium sulfate to 60% saturation reprecipitated the active material. After settling for 18 hours at a temperature of 2° C., the whole was centrifuged at a temperature of −10° C.

The insoluble material was dissolved in 50 ml. 0.1 M NaHCO$_3$ at a temperature of 0° C. (ice bath) and applied to an 8 x 40 cm. column of a cross-linked dextran gel having a water regain value of about 10 gm. per gm. (Sephadex G–100). The column was kept in a jacket through which cold ethanol was circulated to maintain the column at a temperature of 2° C. Elution of the protease from the column was done with 0.1 MNaHCO$_3$. 20 ml. fractions of eluate were collected in a fraction collector provided with a refrigerated bath kept at 2° C. Optical densities of the fractional eluates were read at 280 m$\mu$ and proteolytic activity was followed by the congocoll reaction. The active fractional eluates were combined, dialyzed overnight against running deionized water at a temperature of 4° C. and the dialyzed solution was lyophilized to a dry powder.

The dry powder was dissolved in 2 ml. of the tris-(hydroxymethyl)aminomethane buffer, pH 8.0 and the solution poured onto a diethylaminoethylcellulose column using diethylaminoethylcellulose which had been converted repeatedly from the hydrogen to the hydroxide form with alternate weak hydrochloric acid and sodium hydroxide solutions. The column volume was 1 x 20 cm. equilibrated with pH 8.0, 0.1 M tris(hydroxymethyl) aminomethanehydrochloric acid buffer. Elution was carried out with the same buffer and 5 ml. fractions of eluate were collected. The first discrete peak emerging from the column contained all the enzymatic activity and there was good correlation between the enzyme activity and optical density at 280 m$\mu$. Combined fractional eluates corresponding to this first discrete peak were combined and dialyzed in cellophane tubing (Visking Company) and the dialyzed solution was lyophilized to a dry powder. The dry powder can be redissolved in the tris buffer as before and rerun over the same diethylaminoethyl cellulose column under the identical conditions. Dry powder protease obtained in this manner was used subsequently for the chemical and analytical studies.

Twenty to thirty milligrams of dry protease were obtained per 10 gm. of dry powder from the above-mentioned lyophilized supernatant. The specific activity of the purified preparation determined with hemoglobin as substrate was increased approximately 40-fold over the said dry powder. With a substrate enzyme ratio of 100 to 0.14, the enzyme readily hydrolyzes ribonuclease, hemoglobin, bovine growth hormone and bovine albumin. A convenient manner of expressing the extent of hydrolysis is by the increase of nonprecipitated Kjeldahl nitrogen soluble in 5% trichloroacetic acid.

Starch gel electrophoresis of the enzyme in acidic (pH 4.3) and basic (pH 8.6) gels, both prepared with and without 6 M urea yielded a singly poorly staining band in all four cases. However, these bands contained all the enzymatic activity. The starch gel electrophoresis was done basically as described by Smithies, Biochem. J. 61, 629 (1955). The buffers and staining methods were described earlier, Reusser, Arch. Biochem. Biophys., 106 410 (1964). In basic gels with and without 6 M urea, mobility of the protein was identical. In both instances the protein band was located approximately 5 mm. from the origin toward the cathode. The fact that the component migrated toward the cathode despite the basic pH of gel and running buffer shows that the isoelectric point is slightly above pH 8.6. Polyacrylamide gel electrophoresis in basic gels indicated that the enzyme preparation was free of neutral and acidic proteinaceous contaminants, the enzyme per se being recovered in the sample gel in this system. The technique of Ornstein and Davis was used ("Disc Electrophoresis." Distillation Products Industries, Rochester, N.Y., 1962). Operational conditions and staining techniques are given in Reusser, Arch. Biochem. Biophys., 106, 410 (1964).

The enzyme proved rather resistant to acid hydrolysis and amino acid composition was therefore determined on the basis of 22, 72 and 120-hour hydrolysates, as given in the following table.

TABLE 1.—AMINO ACID COMPOSITION OF ENZYME

| Amino Acid | $\mu$Moles of Amino Acid per mg. N | Average Residue Fraction | Residue Wt.× Average Residue Fraction | Residues per mole (15,000 M.W.) | Nearest Integer |
|---|---|---|---|---|---|
| Lysine | .559 | 4.1 | 5.25 | 5.94 | 6 |
| Histidine | .294 | 2.1 | 2.88 | 3.04 | 3 |
| Arginine | .299 | 2.2 | 3.43 | 3.19 | 3 |
| Aspartic acid | 1.705 | 12.6 | 14.50 | 18.27 | 18 |
| Threonine | 1.200 | 8.9 | 8.99 | 12.91 | 13 |
| Serine | 1.131 | 8.4 | 7.31 | 12.18 | 12 |
| Glutamic acid | .711 | 5.2 | 6.71 | 7.54 | 8 |
| Proline | .461 | 3.4 | 3.30 | 4.93 | 5 |
| Glycine | 1.922 | 14.2 | 8.10 | 20.59 | 21 |
| Alanine | 1.605 | 11.9 | 8.46 | 17.26 | 17 |
| ½ cystine | .111 | .8 | .89 | 1.16 | 1 |
| Valine | .972 | 7.2 | 7.13 | 10.44 | 10 |
| Methionine | .088 | .6 | .78 | .87 | 1 |
| Isoleucine | .489 | 3.6 | 4.07 | 5.22 | 5 |
| Leucine | .622 | 4.6 | 5.20 | 6.67 | 7 |
| Tyrosine | .427 | 3.1 | 5.06 | 4.49 | 4 |
| Phenylalanine | .333 | 2.4 | 3.53 | 3.48 | 3 |
| Tryptophan | .567 | 4.2 | 7.82 | 6.09 | 6 |
| | 13.496 | | 103.41 | | 143 |

15,000/103.41=145.0=Average residue weight.

Sedimentation studies were carried out in the Spinco Model E ultracentrifuge. The apparent sedimentation coefficient in .266 M tris(hydroxymethyl)aminomethane-hydrochloric acid buffer is 2.57±.25.

The protease is free of carbohydrate as evidenced by a negative anthrone reaction. Neish, A. C., Analytical Methods for Bacterial Fermentations, National Research Council of Canada, Prairie Regional Laboratory, Saskatoon, Canada, 1952.

What is claimed is:

1. A dry solid composition of matter free of mycelia and tissue comprising a water-soluble nondialyzable basic proteolytic enzyme elaborated by *Streptomyces moderatus*, Sp. N., having a minimal molecular weight of about 15,000, an isoelectric point of about 8.6, an apparent sedimentation coefficient of 2.57, and 143 amino acid residues per molecular weight of 15,000; and having proteolytic activity over a pH range of from about 4 to about 11 with optimum activity at pH about 8.0.

2. A process for the production of a proteolytic enzyme elaborated by *Streptomyces moderatus* Sp. N. which comprises growing said *Streptomyces moderatus* Sp. N. under aerobic conditions in an aqueous medium containing an assimilable carbohydrate, a source of assimilable nitrogen and traces of inorganic salts at a temperature within the range of about 15° C. to 32° C. and a pH of between about 6 and about 8 for from about 2 to about 5 days, separating the mycelia from the aqueous medium and recovering the so-produced proteolytic enzyme from said mycelia.

3. A process of producing a protease elaborated by *Streptomyces moderatus* Sp. N. which comprises the steps of preparing an aqueous nutrient medium, inoculating the medium with said *Streptomyces moderatus* Sp. N., carrying out aerobic fermentation until a substantial content of proteolytic enzyme is produced by said *Streptomyces moderatus* Sp. N. and subsequently separating the mycelia from the nutrient medium and recovering the so-produced proteolytic enzyme from the mycelia.

4. A process of producing a proteolytic enzyme elaborated by *Streptomyces moderatus* Sp. N. which comprises the steps of
   (1) dissolving a dry powder containing proteolytic activity obtained from said *Streptomyces moderatus* Sp. N. in tris(hydroxymethyl)aminomethane-hydrochloric acid buffer of pH 8.0 and adding thereto a solution of manganese chloride,
   (2) separating the insoluble and soluble portions thereof and adding to the soluble portion sufficient ammonium sulfate to 80% saturation,
   (3) separating and recovering therefrom an insoluble precipitate and dissolving said precipitate in tris(hydroxymethyl)aminomethane-hydrochloric acid buffer of pH 8.0,
   (4) adding sufficient ammonium sulfate thereto to bring about 60% saturation and separating the insoluble portion thereof,
   (5) dissolving said insoluble portion in 0.1 molar sodium bicarbonate and applying the so-produced solution to a cross-linked dextran gel having a water regain value of about 10 gm. per gm.,
   (6) fractionally eluting proteolytically active material from said gel with 0.1 M sodium bicarbonate,
   (7) combining fractional eluates having proteolytic activity and optical density at 280 m$\mu$ and dialyzing said combined eluates,
   (8) lyophilizing the dialyzed combined eluates to a dry powder,
   (9) dissolving said dry powder in tris(hydroxymethyl)aminomethane-hydrochloric acid buffer of pH 8.0 and applying the solution to diethylaminoethylcellulose,
   (10) fractionally eluting the diethylaminoethylcellulose with said buffer of pH 8.0 and combining fractional eluates therefrom corresponding to the first discrete peak of eluate measured by optical density at 280 m$\mu$, and
   (11) dialyzing said combined eluates and lyophilizing the dialyzed eluates to a dry powder.

References Cited
UNITED STATES PATENTS

| | | | |
|---|---|---|---|
| 2,988,487 | 6/1961 | Nickerson et al. | 195—5 |
| 3,127,327 | 3/1964 | Nomoto et al. | 195—62 |

A. LOUIS MONACELL, *Primary Examiner.*

L. M. SHAPIRO, *Assistant Examiner.*